US012340757B2

United States Patent

(12) United States Patent
Choi et al.

(10) Patent No.: US 12,340,757 B2
(45) Date of Patent: Jun. 24, 2025

(54) DISPLAY DEVICE AND DRIVING METHOD THEREOF

(71) Applicant: LG Display Co., Ltd., Seoul (KR)

(72) Inventors: Jiyeon Choi, Paju-si (KR); Taewoo Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/503,006

(22) Filed: Nov. 6, 2023

(65) Prior Publication Data

US 2024/0257766 A1 Aug. 1, 2024

(30) Foreign Application Priority Data

Jan. 31, 2023 (KR) ........................ 10-2023-0012676

(51) Int. Cl.
*G09G 3/3266* (2016.01)

(52) U.S. Cl.
CPC ..... *G09G 3/3266* (2013.01); *G09G 2310/061* (2013.01); *G09G 2310/08* (2013.01)

(58) Field of Classification Search
CPC ........... G09G 3/3266; G09G 2310/061; G09G 2310/08; G09G 3/3233; G09G 2310/0243; G09G 3/3677; G09G 3/3696; G09G 2310/0267; G09G 2310/066; G09G 2320/0295; G09G 2320/043; G09G 2330/02; G09G 2330/021; G09G 2330/026; G09G 2330/028; G09G 2330/04; G09G 3/3275
See application file for complete search history.

(56) References Cited

U.S. PATENT DOCUMENTS

| | | | | |
|---|---|---|---|---|
| 2014/0225882 | A1* | 8/2014 | Wu | G09G 3/20 345/212 |
| 2019/0355304 | A1 | 11/2019 | Tanaka et al. | |
| 2022/0013049 | A1* | 1/2022 | Pyun | G09G 3/3233 |
| 2023/0419873 | A1* | 12/2023 | Chun | G09G 3/2096 |
| 2024/0023373 | A1* | 1/2024 | Kim | G09G 3/3266 |

FOREIGN PATENT DOCUMENTS

KR 20180003745 A 1/2018

* cited by examiner

*Primary Examiner* — Amit Chatly
(74) *Attorney, Agent, or Firm* — Seed IP Law Group LLP

(57) ABSTRACT

Embodiments relate to a display device and driving method thereof. A display device includes a display panel including a pixel arranged thereon, a gate driving circuit configured to supply a scan signal to the pixel, a power control unit configured to output a gate driving voltage to the gate driving circuit, a sensing unit configured to sense an input electric signal and output sensing data, and a timing controller configured to control operations of the gate driving circuit.

18 Claims, 9 Drawing Sheets

DISPLAY DEVICE AND DRIVING METHOD THEREOF

CROSS REFERENCE TO RELATED APPLICATION

The present application claims priority to Korean Patent Application No. 10-2023-0012676, filed on Jan. 31, 2023, the entire contents of which is incorporated herein for all purposes by this reference.

BACKGROUND

Technical Field

The present disclosure relates to a display device and driving method thereof.

Description of the Related Art

A display device includes a data driving circuit that supplies data signals to data lines of a pixel array, a gate driving circuit (or scan driving circuit) that sequentially supplies gate pulses (or scan pulses) synchronized with the data signals to gate lines (or scan lines) of the pixel array, and a timing controller that controls the data driving circuit and the gate driving circuit. Each pixel may include a thin-film transistor (TFT) that responds to the gate pulse to supply the voltage from the data line to the pixel electrode.

The gate driving circuit includes a plurality of stages connected in cascade. Each stage includes a Q node that charges the gate line, a QB node that discharges the gate line, and a control circuit that controls the voltage of the Q node and QB node. The control circuit includes a switch circuit that consists of transistors. These transistors can experience degradation in their characteristics due to direct current (DC) gate bias stress, which can be a factor contributing to the degradation of the gate driving circuit.

BRIEF SUMMARY

Embodiments provide a display device and driving method thereof that are capable of mitigating degradation of circuit components in the gate driving circuit by gradually increasing the gate driving voltage from its initial value.

A display device according to an embodiment may include a display panel including a pixel arranged thereon, a gate driving circuit configured to supply a scan signal to the pixel, a power control circuit configured to output a gate driving voltage to the gate driving circuit, a sensing circuit configured to sense an input electric signal and output sensing data, and a timing controller configured to control operations of the gate driving circuit, the power control circuit, and the sensing circuit, wherein the timing controller may set, as an initial value of the gate driving voltage, a voltage value of the gate driving voltage sensed by the sensing circuit upon the gate driving circuit being powered on by the gate driving voltage.

The power control circuit may increase the gate driving voltage gradually from a baseline voltage, the gate driving circuit may power on to output a feedback current based on the gate driving voltage reaching a lowest voltage that can drive the gate driving circuit, and the timing controller may set a voltage value of the gate driving voltage sensed, upon the feedback current being output, by the sensing circuit as the initial value of the gate driving voltage.

The power control circuit may include a first switch connected between a reference voltage and a reference voltage line of the pixel, and a second switch connected between the gate driving voltage and the reference voltage line, wherein the timing controller may output a voltage selection control signal to control the first switch and the second switch to turn on.

The first switch may be turned on based on the voltage selection control signal being at a first level, and the second switch may be turned on the voltage selection control signal being at a second level different from the first level.

The timing controller may output the voltage selection control signal at the second level and sense the voltage value of the gate driving voltage output to the reference voltage line via the sensing circuit.

The timing controller may output the voltage selection control signal at the first level and sense an electrical signal output to the reference voltage line via the sensing circuit to determine a characteristic value of the pixel.

The gate driving circuit may include a gate output buffer circuit including a pull-up transistor controlling the connection between a clock input node and a gate output node and a pull-down transistor controlling the connection between a low level voltage node and the gate output node, a control circuit controlling the gate output buffer circuit, and a dummy pull-down transistor sharing a gate node with the pull-down transistor.

The sensing circuit may sense an electrical signal output from the dummy pull-down transistor, and the timing controller may compensate the gate driving voltage in a stepwise manner from the initial value based on the sensed electrical signal.

The display device may further include a data driving circuit providing a data voltage to the pixel and including a plurality of source driver integrated circuits, wherein the sensing circuit may be included within the plurality of source driver integrated circuits.

A driving method of a display device according to an embodiment drives the display device including a gate driving circuit providing a scan signal to a pixel, a power control circuit outputting a gate driving voltage to the gate driving circuit, and a sensing circuit sensing an input electrical signal outputting sensing data to output sensing data.

The method may include applying the gate driving voltage to the gate driving circuit via the power control circuit, sensing a voltage value of the gate driving voltage output from the power control circuit upon the gate driving circuit being powered on, and setting the sensed voltage value to the initial value of the gate driving voltage.

The applying of the gate driving voltage may include increasing the gate driving voltage gradually from a baseline voltage, and the sensing of the voltage value of the gate driving voltage may include outputting a feedback current by the gate driving circuit being powered on upon the gate driving voltage reaching a lowest voltage driving the gate driving circuit, and sensing the voltage value of the gate driving voltage output from the power control circuit upon the feedback current being output.

The power control circuit may include a first switch connected between a reference voltage and a reference voltage line of the pixel and a second switch connected between the gate driving voltage and the reference voltage line, and the method may further include outputting, before the applying of the gate driving voltage, a voltage selection control signal for controlling the first switch and the second switch to turn on to the power control circuit.

The sensing of the voltage value of the gate driving voltage may include turning on the second switch upon the voltage selection control signal being at a second level, and sensing the voltage value of the gate driving voltage outputting to the reference voltage line via the sensing circuit.

The sensing the voltage value of the gate driving voltage may include turning on the first switch upon the voltage selection control signal being at a first level, and sensing the electrical signal output to the reference voltage line via the sensing circuit to determine a characteristic value of the pixel.

The gate driving circuit may include a gate output buffer circuit including a pull-up transistor controlling the connection between a clock input node and a gate output node and a pull-down transistor controlling the connection between a low level voltage node and the gate output node, a control circuit controlling the gate output buffer circuit, and a dummy pull-down transistor sharing a gate node with the pull-down transistor.

The method may further include sensing an electrical signal output from the dummy pull-down transistor, and compensating the gate driving voltage in a stepwise manner from the initial value based on the sensed electrical signal.

DETAILED DESCRIPTION

Figure 1:
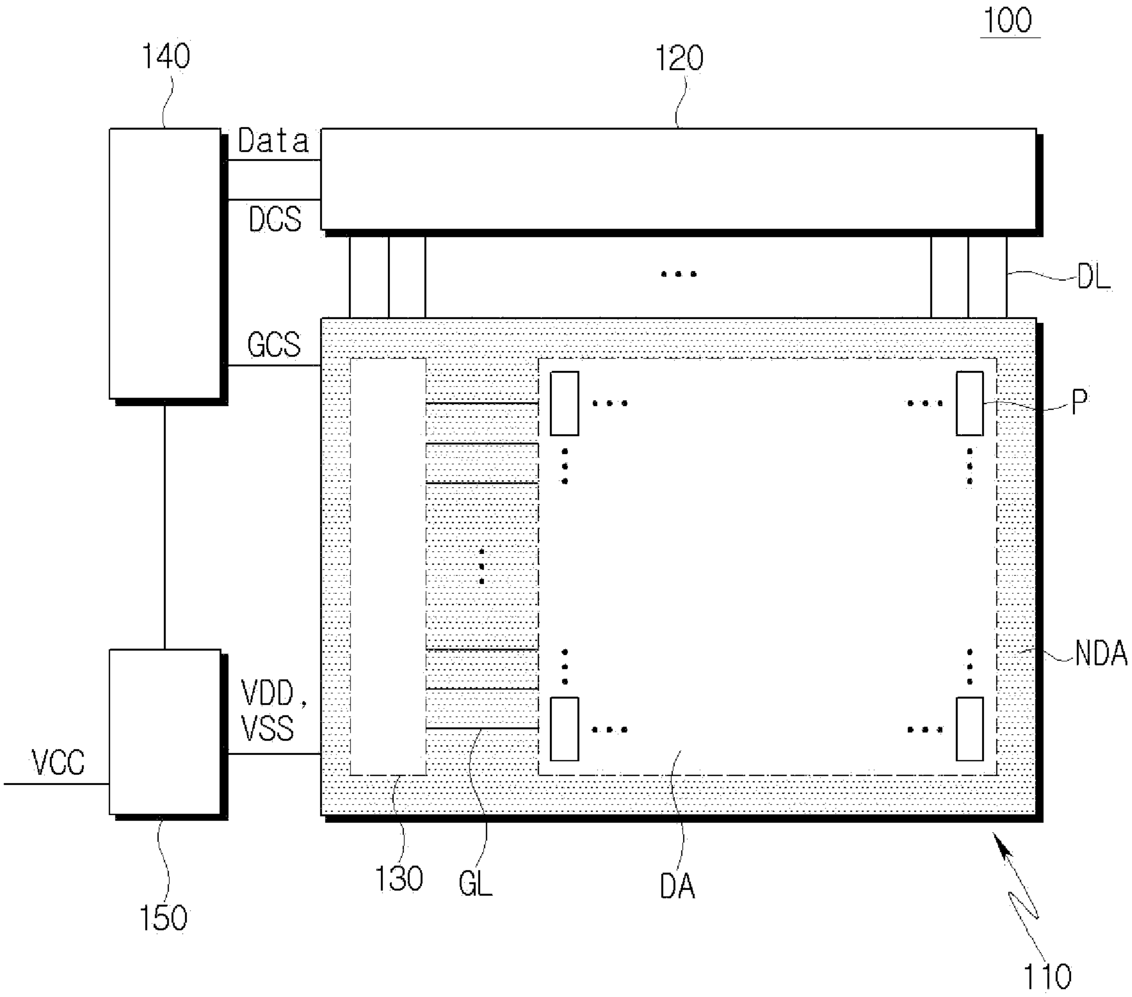
FIG. 1 is a block diagram illustrating a configuration of a display device according to an embodiment.

Hereinafter, embodiments will be described with reference to accompanying drawings. In the specification, when a component (or area, layer, part, etc.) is mentioned as being "on top of," "connected to," or "coupled to" another component, it means that it may be directly connected/coupled to the other component, or a third component may be placed between them.

The same reference numerals refer to the same components. In addition, in the drawings, the thickness, proportions, and dimensions of the components are exaggerated for effective description of the technical content. The expression "and/or" is taken to include one or more combinations that can be defined by associated components.

The terms "first," "second," etc., are used to describe various components, but the components should not be limited by these terms. The terms are used only for distinguishing one component from another component. For example, a first component may be referred to as a second component and, similarly, the second component may be referred to as the first component, without departing from the scope of the present disclosure. As used herein, the singular forms are intended to include the plural forms as well, unless the context clearly indicates otherwise.

The terms such as "below," "lower," "above," "upper," etc., are used to describe the relationship of components depicted in the drawings. The terms are relative concepts and are described based on the direction indicated on the drawing.

It will be further understood that the terms "comprises," "has," and the like are intended to specify the presence of stated features, numbers, steps, operations, components, parts, or a combination thereof but are not intended to preclude the presence or possibility of one or more other features, numbers, steps, operations, components, parts, or combinations thereof.

FIG. 1 is a block diagram illustrating a configuration of a display device according to an embodiment.

With reference to FIG. 1, the display device 100 may include a display panel 110 and a display panel driving circuitry.

The display panel 110 may include a display area DA where images are displayed and a non-display area NDA surrounding the display area DA. The display area DA includes data lines DL, gate lines GL overlapping the data lines, and an array of pixels (pixel array) defined by or positioned at regions of overlap of the data lines DL and the gate lines GL. The non-display area NDA may accommodate at least some of the driving circuits.

The pixels P may include sub-pixels for red (R), green (G), and blue (B) for color implementation. The pixels P may also include a sub-pixel for white (W) in addition to the RGB sub pixels. This embodiment may not be limited to the aforementioned sub-pixels, and the pixels P may also include sub-pixels for cyan (C), magenta (M), and yellow (Y).

Each pixel P may include transistors and storage capacitors formed at the regions of overlap of the corresponding data lines dielectric layer and gate lines GL and light-emitting components connected to the transistors and storage capacitors. The pixels P may emit light based on the current flowing through the light-emitting components that are controlled by the transistors.

The display panel driving circuitry may include a data driving circuit 120, a gate driving circuit 130, a timing controller 140, and a power control unit or circuit 150.

The timing controller 140 receives timing signals from an external system (not shown) and generate data control signals DCS and gate control signals GCS. The timing signals may include data enable signals, horizontal synchronization signals, vertical synchronization signals, and clock signals. The data control signals DCS are output to the data driving circuit 120, and the gate control signals GCS are output to the gate driving circuit 130. The timing controller 140 may generate digital image data from the transmitted image signals and output it to the data driving circuit 120.

The data driving circuit 120 may convert the digital video data to analog data voltages, based on the data control signals DCS. The data driving circuit 120 may apply the analog data voltages to the corresponding pixels P through the data lines DL. In an embodiment, a multiplexer, which is not shown, may be placed between the data driving circuit 120 and the data lines DL. The multiplexer may distribute the data voltages from the data driving circuit 120 to the data lines DL under the control of the timing controller 140.

The data driving circuit 120 may include at least one source driver integrated circuit SDIC. Each source driver integrated circuit SDIC may include a shift register, a latch circuit, a digital-to-analog converter, and an output buffer. In some cases, each source driver integrated circuit SDIC may include an analog-to-digital converter.

The gate driving circuit 130 may sequentially output scan signals through the gate lines GL, one per horizontal period, in response to the gate control signals GCS. As a result, each pixel row connected to a gate line GL is turned on for one horizontal period. The gate driving circuit 130 may be composed of stage circuits connected respectively to a plurality of gate lines GL and may be configured in a gate-in-panel (GIP) form mounted on the non-display area NDA of the display panel 110, as illustrated.

The gate driving circuit 130 may be implemented in GIP type. In this case, the gate driving circuit 130 may be placed on the non-display area NDA of the display panel 110. In another embodiment, the gate driving circuit 130 may also be implemented in chip-on-film (COF) type.

The power control unit 150 converts the external voltage VCC input from the outside into the high-potential driving voltage EVDD and the low-potential driving voltage EVSS, which are the standard voltages used internally in the display device 100, and outputs the driving voltages to the gate driving circuit 130. The power control unit 150 may include a voltage amplifier to convert the external voltage VCC into the high-potential driving voltage EVDD and the low-potential driving voltage EVSS.

Furthermore, the power control unit 150 may also generate a gate driving voltage GVDD to drive the gate driving circuit 130 by converting the external voltage VCC. The gate driving voltage GVDD may be generated at a level that may turn on the transistors provided in the pixels P.

Figure 2:
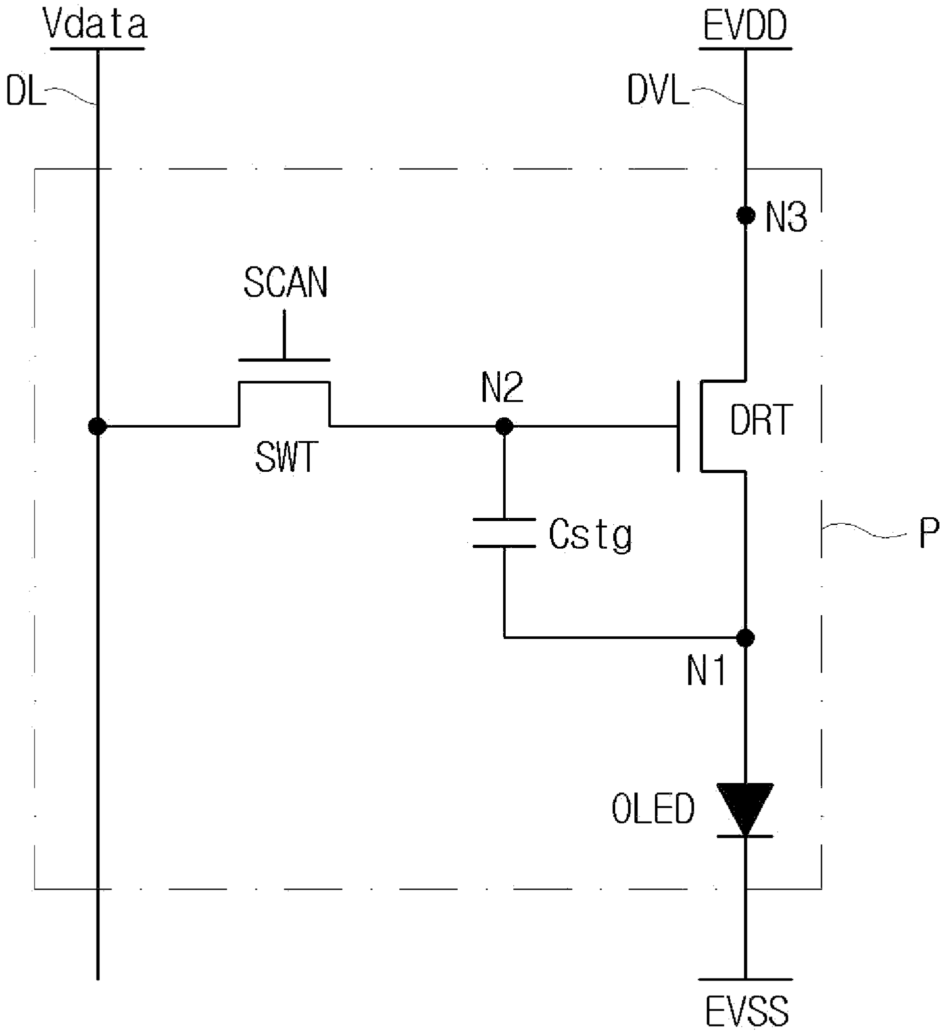
FIG. 2 is a schematic diagram illustrating a pixel configuration of a display device according to an embodiment.

FIG. 2 is a schematic diagram illustrating a pixel configuration of a display device according to an embodiment.

With reference to FIG. 2, in the display device 100 according to an embodiment, each pixel P may include an organic light-emitting diode OLED, a driving transistor DRT to control the driving current applied to the OLED, a switching transistor SWT to deliver a data voltage to the gate node of the driving transistor DRT, and a storage capacitor Cstg to maintain the data voltage corresponding to the video signal voltage or a corresponding voltage for one frame duration.

The organic light-emitting diode OLED may be composed of a first electrode (e.g., anode electrode), an organic layer, and a second electrode (e.g., cathode electrode).

The driving transistor DRT drives the organic light-emitting diode OLED by supplying driving current to the organic light-emitting diode OLED. The first node N1 of the driving transistor DRT may be electrically connected to the first electrode of the organic light-emitting diode OLED and may be the source node or the drain node of the driving transistor DRT. The second node N2 is electrically connected to the source node or the drain node of the switching transistor SWT and may be the gate node of the driving transistor DRT. The third node N3 may be electrically connected to the driving voltage line DVL supplying a high-potential driving voltage EVDD and may be the drain node or the source node of the driving transistor DRT.

The first transistor SWT is electrically connected between the data line DL and the second node N2 of the driving transistor DRT and controlled by the scan signal SCAN received through the gate line and applied at the gate node thereof. The first transistor SWT is turned on by the scan signal SCAN and may transmit the data voltage Vdata supplied through the data line DL to the second node N2 of the driving transistor DRT.

The storage capacitor Cstg may be electrically connected between the first node N1 and the second node N2 of the driving transistor DRT. The storage capacitor Cstg is an external capacitor intentionally designed outside the driving transistor DRT rather than an internal capacitor like a parasitic capacitor existing between the first node N1 and the second node N2 of the driving transistor DRT.

Meanwhile, in the display device 100 according to an embodiment, as the driving time of each pixel P accumulates (e.g., over the life time of the display device 100), there may be degradation of circuit components such as the organic light emitting diodes OLED and driving transistor DRT. As a result, the intrinsic characteristic values of the circuit components may change. These characteristic values may include the threshold voltage and mobility of the driving transistor DRT and the threshold voltage of the organic light-emitting diode OLED. Such changes in the characteristic values of the circuit components lead to variations in luminance of the corresponding pixel P, causing a decrease in the uniformity of luminance in the display panel 110 and deteriorating image quality.

The display device 100 according to an embodiment may provide sensing functionality to sense the characteristic values or changes in the characteristic values of the circuit components and compensation functionality to compensate for the characteristic value deviations between circuit components based on the sensing results.

Figure 3:
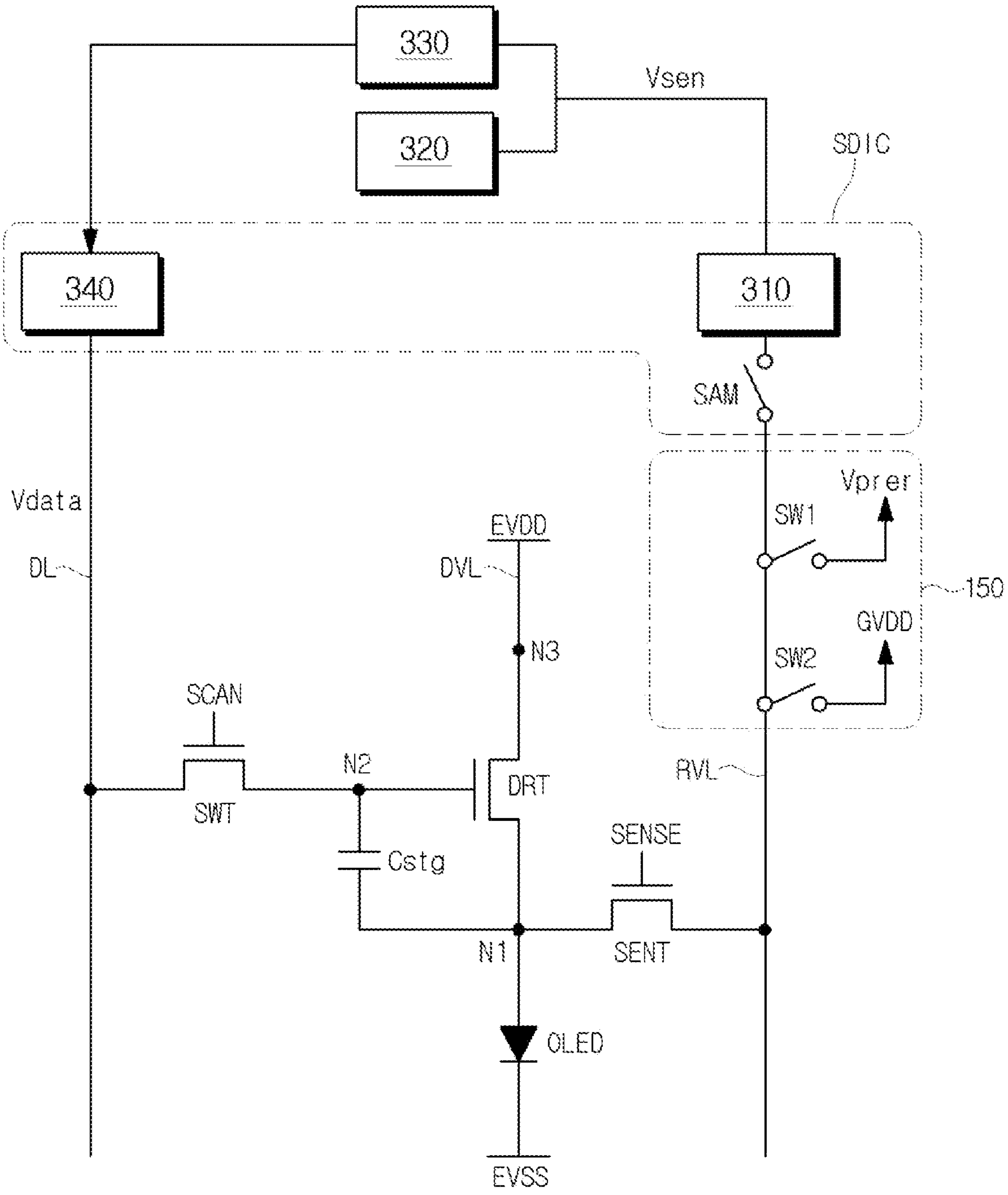
FIG. 3 is a schematic diagram illustrating a pixel configuration and compensation circuitry of a display device according to another embodiment.

FIG. 3 is a schematic diagram illustrating a pixel configuration and compensation circuitry of a display device according to another embodiment.

With reference to FIG. 3, each pixel P arranged in the display panel 110 according to an embodiment may include a SENT in addition to the organic light-emitting diode OLED, the driving transistor, DRT, the switching transistor SWT, and the storage capacitor Cstg.

The second transistor SENT is electrically connected between the second node N1 of the driving transistor DRT and a reference voltage line RVL that supplies a reference voltage Vprer and may be controlled by a sensing signal SENSE, which is a type of scan signal, applied to the gate node. The second transistor SENT turns on in response to the sensing signal SENSE and applies the reference voltage Vref supplied through the reference voltage line RVL to the second node N1 of the driving transistor DRT. The second transistor SENT may also serve as one of the voltage sensing paths for the first node N1 of the driving transistor DRT.

In an embodiment, the scan signal SCAN and the sensing signal SENSE may be separate gate signals. In this case, the scan signal SCAN and the sensing signal SENSE may be applied to the gate nodes of the first transistor SWT and the second transistor SENT, respectively, through different gate lines. In another embodiment, the scan signal SCAN and the sensing signal SENSE may be the same gate signal. In this case, the scan signal SCAN and the sensing signal SENSE may be commonly applied to the gate nodes of both the first transistor SWT and the second transistor SENT through the same gate line.

The driving transistor DRT, the switching transistor SWT, and the sensing transistor SENT may each be implemented as an n-type or p-type transistors With reference to FIG. 3, the display device 100 according to an embodiment may include a sensing unit or circuit 310 for sensing electrical signals (voltages) reflecting pixel characteristic values (characteristic values of the driving transistor and organic light-emitting diode) or changes in the pixel characteristic values, converting the sensed electrical signals to digital values, and outputting the digital values as sensing data, a memory 320 for storing the sensing data Vsen, and a compensation unit or circuit 330 for performing compensation processes to compensate the pixel characteristic values or characteristic value deviations based on the sensing data.

The sensing unit 310 may be configured to include at least one analog-to-digital converter. Each analog-to-digital converter may be included within a SDIC that is included in the data driving circuit 120. The sensing data output from the sensing unit 310 may have a low voltage differential signaling (LVDS) data format as an example. The compensation unit 330 may be included within the timing controller 140.

A display device 100 according to an embodiment may include a first switch SW1 that controls the supply of a reference voltage Vprer to a reference voltage line RVL for sensing operation, a second switch SW2 that controls the supply of the gate driving voltage GVDD to the reference voltage line RVL, and a sampling switch SAM. The first switch SW1 and the second switch SW2 may be implemented within the power control unit 150.

The first switch SW1 controls the connection between the circuitry of generating the reference voltage Vprer and the reference voltage line RVL. When the first switch SW1 is turned on, the reference voltage Vprer is supplied to the reference voltage line RVL. The reference voltage Vprer supplied to the reference voltage line RVL may be applied to the first node N1 of the driving transistor DRT through the turned-on sensing transistor SENT.

When the voltage at the first node N1 of the driving transistor DRT becomes a voltage state reflecting a pixel characteristic value, the voltage in the reference voltage line RVL, which is equipotential to the first node N1 of the driving transistor DRT, may also become the voltage state reflecting the pixel characteristic value. Here, the voltage reflecting the pixel characteristic value may be charged to the line capacitor formed on the reference voltage line RVL. That is, when the sensing transistor SENT is turned on, the voltage at the first node N1 of the driving transistor DRT may be the same as the voltage of the reference voltage line, i.e., the voltage charged to the line capacitor formed on the reference voltage line RVL.

When the voltage at the first node N1 of the driving transistor DRT becomes a voltage state reflecting the pixel characteristic value, the sampling switch SAM is turned on, allowing the connection between the sensing unit 310 and the reference voltage line RVL. Consequently, the sensing unit 310 senses the voltage in the reference voltage line RVL, which reflects the pixel characteristic value. Here, the reference voltage line RVL is also referred to as the sensing line. That is, the sensing unit 310 senses the voltage at the first node N1 of the driving transistor DRT.

In an embodiment, the reference voltage line RVL may be arranged per column of pixels or per two or more columns of pixels. For example, in the case where one pixel consists of four sub-pixels (red sub-pixel, white sub-pixel, green sub-pixel, blue sub-pixel), the reference voltage line RVL may be arranged with one line per pixel column containing four sub-pixel columns (red sub-pixel column, white sub-pixel column, green sub-pixel column, blue sub-pixel column).

In the case of sensing the threshold voltage of the driving transistor DRT, the voltage sensed by the sensing unit 310 may be a voltage value (Vdata-Vth or Vdata-ΔVth) including the threshold voltage (Vth) or threshold voltage variation (ΔVth) of the driving transistor DRT. Meanwhile, in the case of sensing the mobility of the driving transistor DRT, the voltage sensed by the sensing unit 310 may be a voltage value representing the mobility of the driving transistor DRT.

The sensing unit 310 converts the sensed voltage into a digital value and generates and outputs the sensing data Vsen including the converted digital value (sensing value). The sensing data Vsen outputted from the sensing unit 310 may be stored in the memory 320 or provided to the compensation unit 330.

The compensation unit 330 may based on the sensing data stored in the memory 320 or provided by the sensing unit 310, check the characteristic values (e.g., threshold voltage and mobility) of the driving transistors DRT within the corresponding pixel P or changes in the characteristic values of the driving transistors DRT (e.g., changes in threshold voltage and mobility) and perform the characteristic value compensation process.

Here, the changes in characteristic values of the driving transistor DRT may refer to the change in the current sensing data Vsen compared to the previous sensing data Vsen, or the change in the current sensing data Vsen compared to the reference compensation data.

The characteristic value compensation process may include a threshold voltage compensation process for compensating the threshold voltage of the driving transistor DRT and a mobility compensation process for compensating the mobility of the driving transistor DRT. The compensation unit 330 may modify the video data Data through threshold voltage compensation or mobility compensation and supply the modified data to the corresponding source driver integrated circuit SDIC within the data driving circuit 120. Consequently, the source driver integrated circuit SDIC converts the data modified by the compensation unit 330 into a data voltage via a digital-to-analog converter 340 and supplies the data voltage to the corresponding pixel, allowing for actual compensation of pixel characteristic values. The pixel characteristic value compensation helps reduce or prevent luminance deviations among pixels, leading to an improvement in the uniformity of luminance across the display panel 110 and the overall image quality.

The second switch SW2 controls the connection between the circuitry generating the gate driving voltage GVDD and the reference voltage line RVL. When the second switch SW2 is turned on, the gate driving voltage GVDD is supplied to the floating reference voltage line RVL.

Afterward, when the sampling switch SAM is turned on, the sensing unit 310 may be connected to the reference voltage line RVL. Accordingly, the sensing unit senses the gate driving voltage GVDD. That is, the sensing unit 310 may directly sense the gate driving voltage GVDD supplied to the gate driving circuit 130.

The sensing unit 310 converts the sensed voltage into a digital value and generates and outputs the sensing data Vsen including the converted digital value (sensing value). The sensing data Vsen outputted from the sensing unit 310 may be stored in the memory 320.

Figure 4:
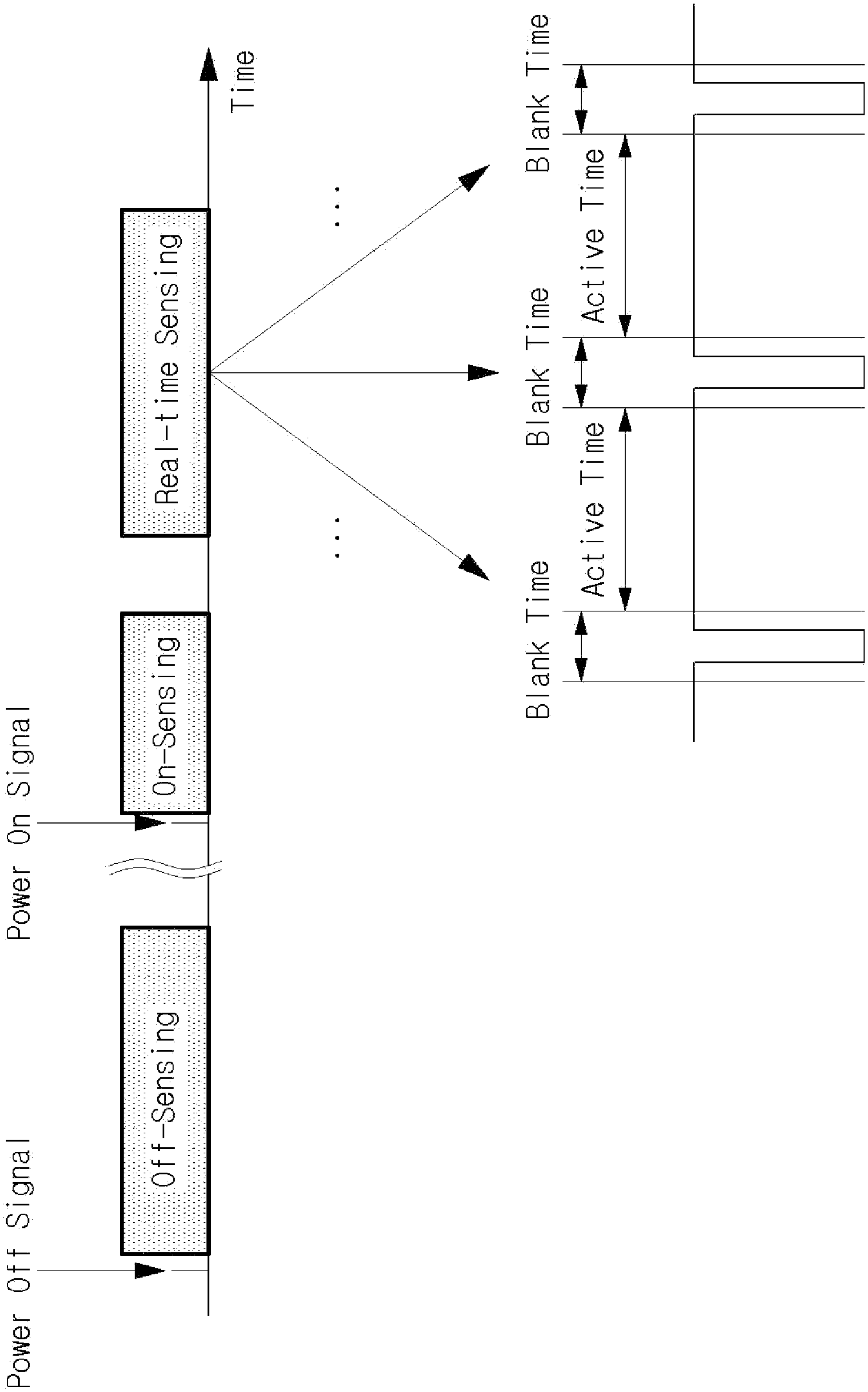
FIG. 4 is a diagram illustrating sensing timing of a display device according to an embodiment.

FIG. 4 is a diagram illustrating sensing timing of a display device according to an embodiment.

With reference to FIG. 4, the display device 100 according to an embodiment may sense the characteristic values of the circuit components within each of pixels arranged on the display panel 110 upon detection of a power-off signal generated in response to a user input or the like. The display device 100 may also sense the gate driving voltage GVDD upon detection of the power-off signal. This sensing process that occurs after the power-off signal is called "off-sensing."

Similarly, the display device 100 may sense the characteristic values of circuit components within each sub-pixel after the occurrence of a power-on signal but before the actual image display starts. The display device 100 may also sense the gate driving voltage GVDD upon detection of the power-on signal. This sensing process that occurs after the power-on signal is called "on-sensing."

Furthermore, the display device 100 according to an embodiment may perform sensing of the characteristic values of circuit components within each sub-pixel during image display. The display device 100 may also sense the gate driving voltage GVDD during image display. This sensing process that occurs during image display is referred to as "real-time sensing" or "RT sensing." The real-time sensing takes place at each blank time between active times, which is determined by the vertical sync signal.

Meanwhile, when one or more of the signal lines (DL, RVL, GL, and DVL) arranged on the display panel 110 are open or when two or more signal lines are shorted, the sensing values may be obtained abnormally. Therefore, when the difference between the sensing values obtained through the sensing process described above and the reference sensing values exceeds a predetermined or selected range, it is possible to conclude that there is a defect in the signal lines.

Figure 5:
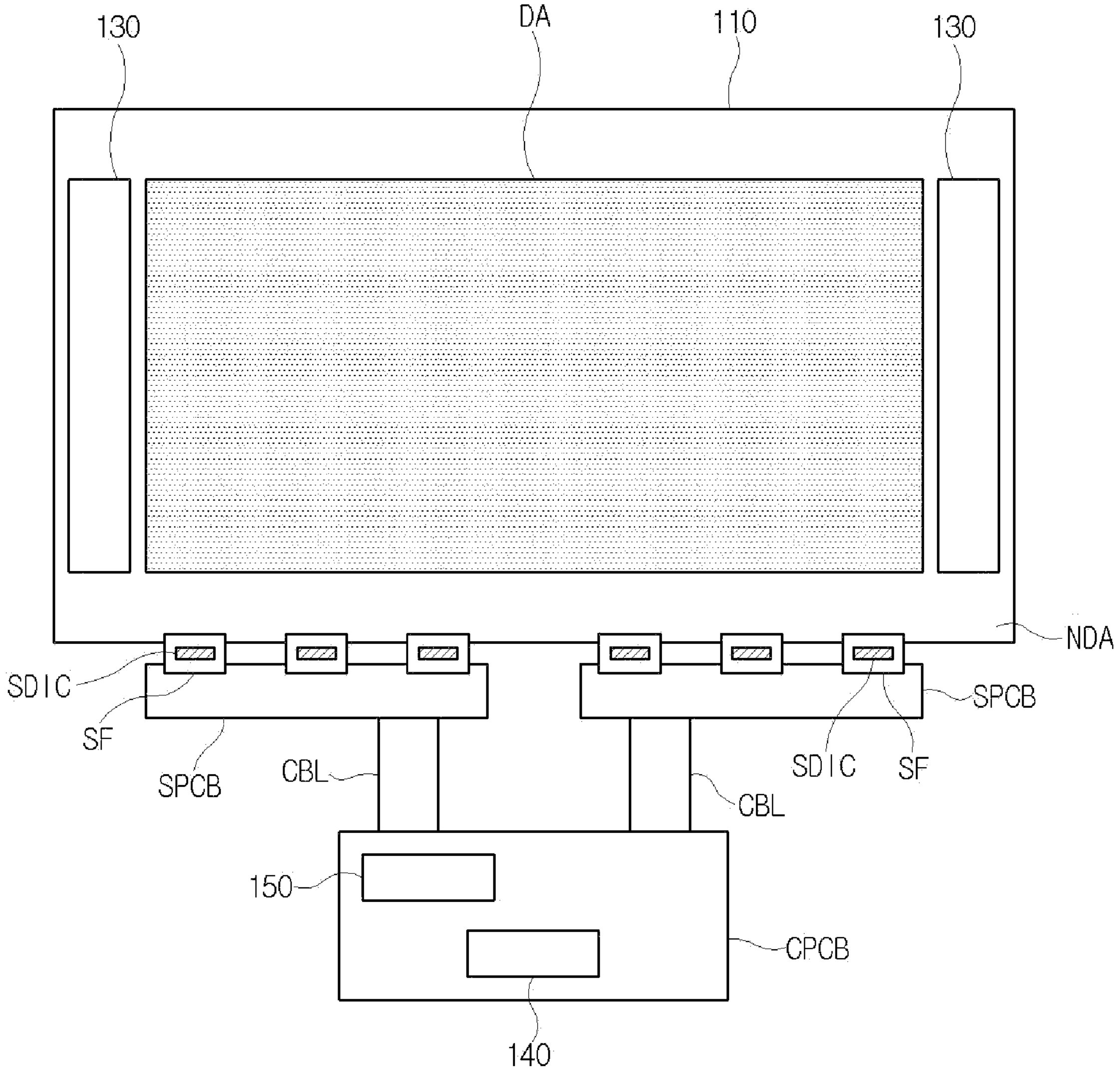
FIG. 5 is a schematic diagram illustrating a configuration of a display device according to an embodiment.

FIG. 5 is a schematic diagram illustrating a configuration of a display device according to an embodiment.

With reference to FIG. 5, the display panel 110 may include a display area DA where images are displayed and a non-display area NDA where no images are displayed.

The data driving circuit 120 may include one or more SDICs. Each SDIC may include a shift register, a latch circuit, a digital-to-analog converter, and an output buffer. In some cases, each SDIC may include an analog-to-digital converter.

Each SDIC may be connected to the display panel 110 using a tape automated bonding (TAB) method or connected to the bonding pads of the display panel 110 using chip-on-glass (COG) or chip-on-panel (COP) method or implemented using chip-on-film (COF) method and connected to the display panel 110. In this case, each SDIC may be mounted on a circuit film SF connected to the non-display area NDA of the display panel 110.

The data driving circuit 120 may be connected to one side (e.g., top or bottom) of the display panel 110. Depending on the driving method and panel design, the data driving circuit 120 may be connected to both sides (e.g., top and bottom) of the display panel 110, or it may be connected to two or more sides out of the four sides of the display panel 110.

The gate driving circuit 130 may be implemented in GIP type. In this case, the gate driving circuit 130 may be placed on the non-display area NDA of the display panel 110. In another embodiment, the gate driving circuit 130 may also be implemented in chip-on-film (COF) type.

The gate driving circuit 130 may be connected to one side or both sides (left or right) of the display panel 110 as shown in the drawing. The gate driving circuit 130 may be connected to both sides (e.g., left and right) or two or more sides out of the four sides of the display panel 110.

In another embodiment, at least one of the data driving circuit 120 and the gate driving circuit 130 may be arranged in the display area DA. For example, at least one of the data driving circuit 120 and the gate driving circuit 130 may be arranged without overlapping the pixels P or may be partially or entirely overlapped with the pixels P.

The display device 100 may include at least one source printed circuit board SPCB and a control printed circuit board CPCB for mounting control components and other electrical devices.

The circuit film SF on which the SDIC is mounted may be connected to the at least one source printed circuit board SPCB. That is, the circuit film SF with the SDIC may be electrically connected at one side thereof to the display panel 110 and at the other side thereof to the source printed circuit board SPCB.

The control printed circuit board CPCB may accommodate components such as the timing controller 140 and the power control unit 150. The timing controller 140 may perform overall control functions related to the driving of the display panel 110 and control the operation of the data driving circuit 120 and the gate driving circuit 130. The power control unit 150 may supply various voltages or currents to the data driving circuit 120, gate driving circuit 130, and other components, as well as control the supply of various voltages or currents. The timing controller 140 may be implemented with various circuits or electronic components such as integrated circuits (ICs), field programmable gate arrays (FPGA), application specific integrated circuits (ASICs), or processors.

The at least one source printed circuit board SPCB and the control printed circuit board CPCB may be electrically connected and in data communication with each other through at least one connection cable CBL. Here, the connection cable CBL may be, for example, a flexible printed circuit FPC or a flexible flat cable FFC.

The at least one source printed circuit board SPCB and control printed circuit board CPCB may also be implemented as a single printed circuit board, integrating them together.

Figure 6:
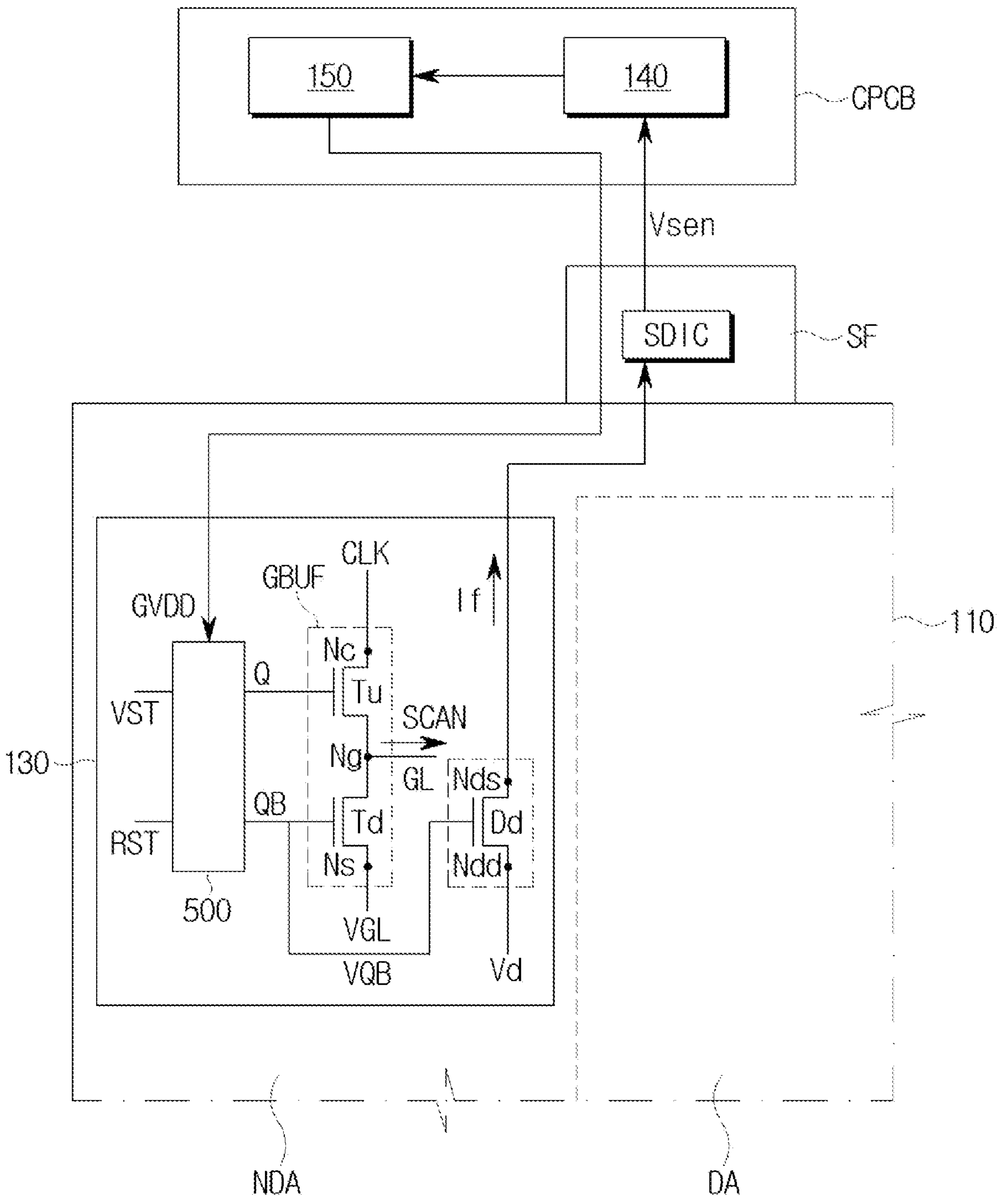
FIG. 6 is a diagram illustrating the connection relationship of some components of a display device equipped with dummy pull-down transistors.

In an embodiment, the display device 100 may include one or more dummy pull-down transistors Dd formed on the display panel 110, as shown in FIG. 6. The dummy pull-down transistors Dd may be dispersed and positioned adjacent to the four corners of the display panel 110 as illustrated, but not limited thereto. The dummy pull-down transistors Dd may be connected to at least one node of the gate driving circuit 130, such as the Q node and/or QB node to be described later.

The dummy pull-down transistors Dd may transmit a monitoring voltage reflecting the degradation level of the circuit components constituting the gate driving circuit 130 to the timing controller 140 or the power control unit 150.

Figure 7:
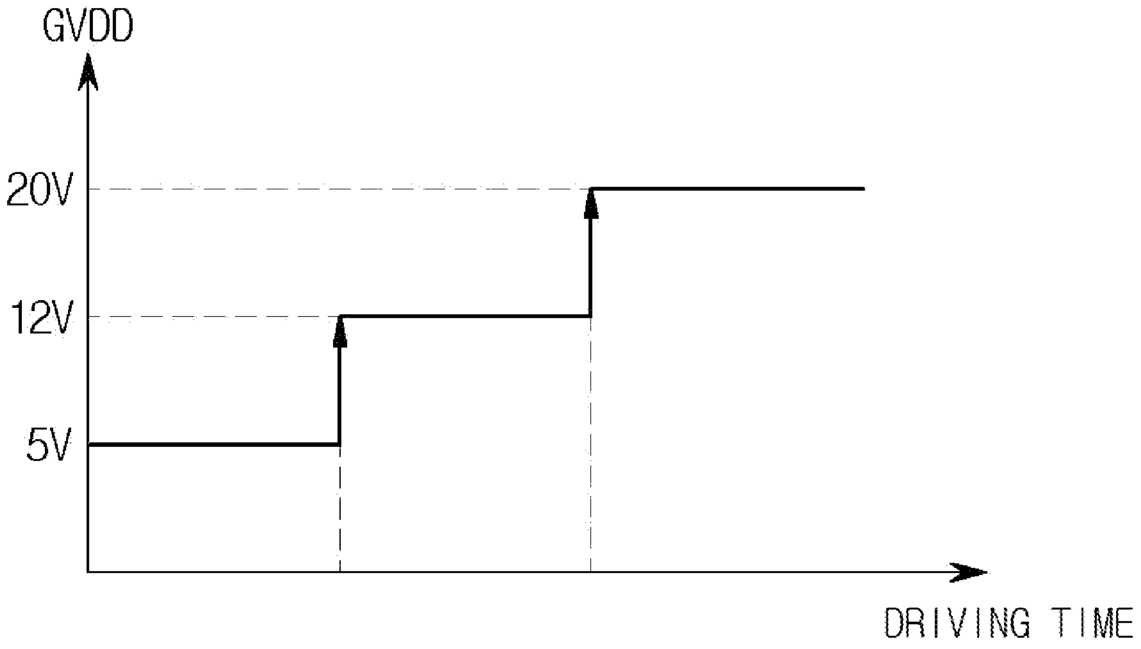
FIG. 7 illustrates the variation of gate driving voltage applied to a gate driving circuit in FIG. 6.

FIG. 6 is a diagram illustrating the connection relationship of some components of a display device equipped with dummy pull-down transistors. FIG. 7 illustrates the variation of gate driving voltage applied to a gate driving circuit in FIG. 6.

With reference to FIG. 6, the gate driving circuit 130 of the display device 100 may generate and output a scan signal SCAN based on a clock signal CLK. The scan signal SCAN may be supplied to the gate lines GL arranged on the display panel 110.

The gate driving circuit 130 may include a gate output buffer circuit GBUF that outputs the scan signal SCAN based on the clock signal CLK, and a control circuit 500 that controls the gate output buffer circuit GBUF.

The gate output buffer circuit GBUF may include a pull-up transistor Tu for controlling the connection between the clock input node Nc receiving the input of the clock signal CLK and the gate output node Ng outputting the scan signal SCAN and a pull-down transistor Td for controlling the connection between the gate output node Ng and the low-level voltage node Ns receiving the low-level voltage VGL.

The control circuit 500 receives input signals such as a start signal VST and a reset signal RST to control the operation of the gate output buffer circuit GBUF. For this purpose, the control circuit 500 may control the voltages of the nodes Q and the QB. The control circuit 500 may control the voltage of the node QB with the gate driving voltage GVDD, which is the DC voltage.

The gate driving circuit 130 also includes a transistor vulnerable in terms of reliability, e.g., a dummy pull-down transistor Dd that is subjected to the same stress as the pull-down transistor Td. The gate node of the dummy pull-down transistor Dd may be electrically connected to the gate node of the pull-down transistor Td. That is, the gate nodes of both the pull-down transistor Td and the dummy pull-down transistor Dd may be electrically connected to a single QB node QB.

The dummy pull-down transistor Dd is similar in structure and characteristics to the pull-down transistor Td, and the gate electrode of the dummy pull-down transistor Dd may be connected to the QB node QB along with the gate electrode of the pull-down transistor Td. When the pull-down transistor Td degrades due to gate bias stress, the dummy pull-down transistor Dd, which shares the QB node QB, may degrade to the same degree of degradation as the pull-down transistor Td because it is subjected to the same stress as the pull-down transistor Td. Therefore, the dummy pull-down transistor Dd may be utilized for detecting the degradation of the pull-down transistor Td. Similarly, when the dummy pull-down transistor Dd shares the Q node Q with the pull-up transistor Tu, the dummy pull-down transistor Dd may be utilized for detecting the degradation of the pull-up transistor Tu. The dummy pull-down transistor Dd that shares the Q node Q with the pull-up transistor Tu may also be referred to as a dummy pull-up transistor.

The dummy pull-down transistor Dd is connected to a dummy driving voltage Vd at the drain node Ndd, and the source node Nds may be connected to the sensing unit 310 of the SDIC. The arrangement of the drain node Ndd and the source node Nds of the dummy pull-down transistor Dd may be reversed depending on the type of transistor.

The SDIC includes a sensing unit 310 that senses the electrical signals output from the gate driving circuit 130. For example, the sensing unit 310 may sense the feedback current when flowing through the source node Nds of the dummy pull-down transistor Dd or the voltage caused by the feedback current. The sensing unit 310 may convert the sensed voltage into digital sensing data Vsen and output the digital sensing data Vsen to the timing controller 140.

The timing controller 140 may determine the degradation degree of the control circuit 500, e.g., the pull-down transistor Td, based on the sensing data Vsen and determine the voltage value of the power supply voltage GVDD applied to the control circuit 500 based on the dispersion of lifespan or expected lifespan of the device. For example, the timing controller 140 may gradually increase the gate driving voltage GVDD from a low voltage to a high voltage depending on the drive time and/or degradation degree as shown in FIG. 7. The pull-down and pull-up transistors Td, Tu may be included in the control circuit 500, such that determining the degradation degree of the pull-down transistor Td, for example, is determining the degradation degree of the control circuit 500.

As shown in FIG. 7, the gate driving voltage GVDD may be compensated to gradually increase from an initial low voltage (e.g., 5V) to a high voltage (e.g., 12V or 20V). The initial value of the gate driving voltage GVDD may be a minimum or lowest voltage by which the gate driving circuit 130 can be powered on, i.e., the minimum or lowest voltage needed to turn on the transistors provided in the control circuit 500 (e.g., the pull-up and/or pull-down transistors Tu, Td). For example, the pull-down transistor Td may have threshold voltage degradation that increases its threshold voltage, such that the initial low value (e.g., 5V) does not cause the pull-down transistor Td to enter a saturation region. Prior to entering the saturation region, the pull-down transistor Td may conduct a very small or no current. When the gate driving voltage GVDD is sufficiently high to cause the pull-down transistor Td to enter the saturation region, the pull-down transistor Td (and the dummy pull-down transistor Dd) may conduct much higher current, which can be detected as the feedback current If.

The initial value of the gate driving voltage GVDD may be determined through testing or other means before product shipment. Hereinafter, a method for setting the initial value of the gate driving voltage GVDD is described in detail.

Figure 8:
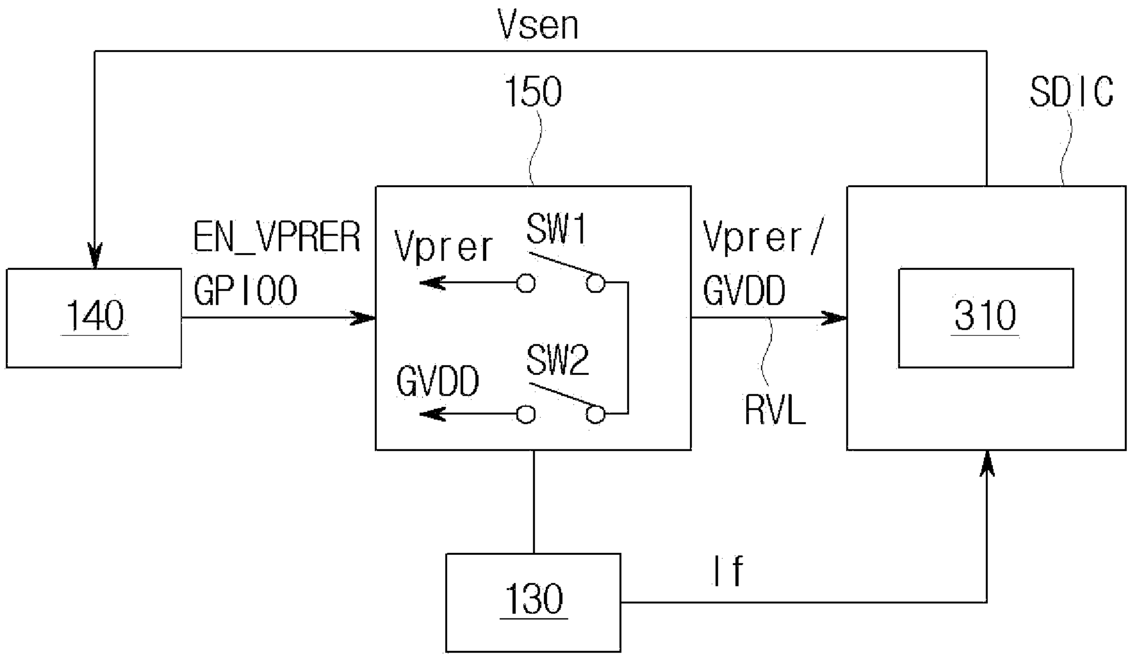
FIG. 8 is a diagram illustrating the connection relationship of some components of a display device for setting an initial value of a gate driving voltage.
Figure 9:
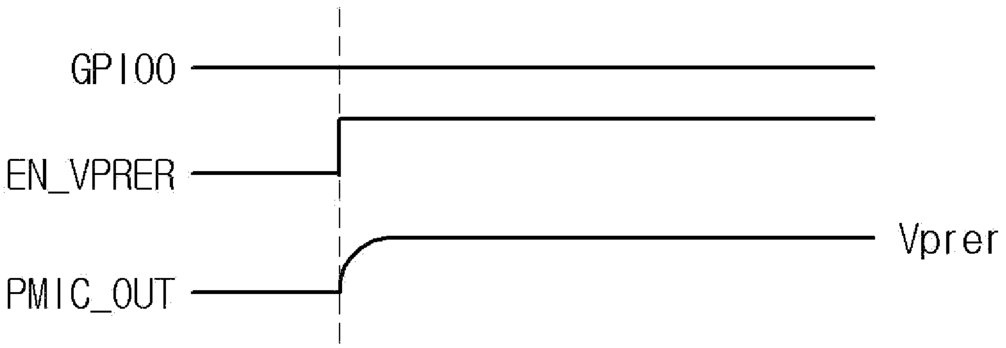
FIG. 9 is a timing diagram illustrating input and output signals of a timing controller and a power supply unit in normal sensing mode.
Figure 10:
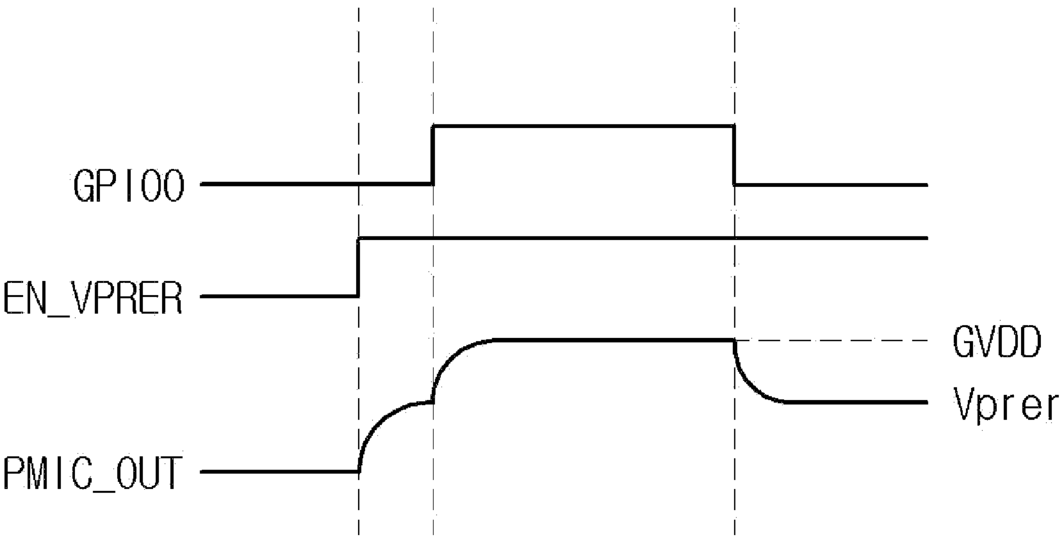
FIG. 10 is a timing diagram illustrating input and output signals of a timing controller and a power supply unit in normal sensing mode.

FIG. 8 is a diagram illustrating the connection relationship of some components of a display device for setting an initial value of a gate driving voltage. FIG. 9 is a timing diagram illustrating input and output signals of a timing controller and a power supply unit or "power supply" in normal sensing mode. FIG. 10 is a timing diagram illustrating input output signals of a timing controller and a power supply unit in gate sensing mode.

In an embodiment, the timing controller 140 may sense the characteristic values of the display panel 110 and store the characteristic values in the memory (320 in FIG. 3). For example, the timing controller 140 may sense threshold voltages and/or mobility of the pixels P arranged on the display panel 110 and store and manage the sensed characteristic values. The timing controller 140 may perform compensation based on the characteristic values during the display driving of the display device 100.

In an embodiment, the timing controller 140 may set the initial value of the gate driving voltage GVDD and store the initial value in memory 320 or the like. For example, the timing controller 140 may gradually increase the gate driving voltage GVDD applied to the gate driving circuit 130 from a baseline voltage via power control unit 150. When the gate driving circuit 130 powers on at the predetermined or selected gate driving voltage GVDD, a feedback current If may be detected through the sensing unit 310 of the SDIC connected to the dummy pull-down transistor Dd of the gate driving circuit 130. The timing controller 140 may sense the voltage value of the gate driving voltage GVDD, which is supplied from the power control unit 150 to the gate driving circuit 130, when the feedback current If is detected, and set the voltage value as the initial value of the gate driving voltage GVDD.

Such initial characteristic value sensing and initial value setting of the gate driving voltage GVDD may be performed by the manufacturer or others before product shipment. For this purpose, the timing controller 140 may be controlled to operate in a normal sensing mode for sensing the initial characteristic values of the pixels and a gate sensing mode for determining the initial value of the gate driving voltage GVDD. The control of the sensing modes may be performed by an external control signal or the like, but is not limited thereto.

In the normal sensing mode, the timing controller 140 controls the power control unit 150 to output a sensing reference voltage Vprer to the reference voltage line RVL of the pixel P. In the gate sensing mode, the timing controller 140 controls the power control unit 150 to output the gate driving voltage GVDD to the reference voltage line RVL of the pixel P.

To control the sensing mode, the timing controller 140 and the power control unit 150 may be connected through general purpose input/output (GPIO) pins. To activate the gate sensing mode, the timing controller 140 may output a voltage selection control signal GPIO0 through the GPIO pin.

The power control unit 150 may operate in the normal sensing mode in response to the voltage selection control signal GPIO0 at the inactive level (e.g., level 1) (or the non-output state of the voltage selection control signal GPIO0), and it may operate in the gate sensing mode in response to the voltage selection control signal GPIO0 at the active level (e.g., level 2) (or the output state of the voltage selection control signal GPIO0). The power control unit 150 outputs, to the SDIC, the sensing reference voltage Vprer in the normal sensing mode and the gate driving voltage GVDD in the gate sensing mode.

The power control unit 150 may be configured as a switching circuit to select and output either the reference voltage Vprer or the gate driving voltage GVDD. For example, the power control unit 150 may include a first switch SW1 connected to the voltage source of the reference voltage Vprer to turn on in response to the inactive level of the voltage selection control signal GPIO0, and a second switch SW2 connected to the voltage source of the gate driving voltage GVDD to turn on in response to the active level of the voltage selection control signal GPIO0. The reference voltage Vprer may be output in response to the first switch SW1 being turned on, and the gate driving voltage GVDD may be output in response to the second switch SW2 being turned on.

With reference to FIG. 9, the timing controller 140 outputs the reference voltage enable signal EN_VPRER to the power control unit 150 to activate the sensing mode in the normal sensing mode. The timing controller 140 may output the voltage selection control signal GPIO0 at the inactive level for the operation in the normal sensing mode.

The power control unit 150 may generate the reference voltage Vprer in response to the reference voltage enable signal EN_VPRER and output the reference voltage Vprer (PMIC_OUT) through the first switch SW1 turned on according to the voltage selection control signal GPIO0.

The reference voltage Vprer may be applied to the reference voltage line RVL connected to the pixels P. Then, as described with reference to FIG. 3, the voltage in the reference voltage line RVL may be sensed through the sensing unit 310 of the SDIC, and the timing controller 140 may determine the initial characteristic values of the pixels P based on the sensing data Vsen received from the sensing unit 310.

With reference to FIG. 10, the timing controller 140 may output the voltage selection control signal GPIO0 at the active level for the operation in the gate sensing mode.

The power control unit 150 may generate the gate driving voltage GVDD and output the gate driving voltage GVDD (PMIC_OUT) through the second switch SW2 turned on according to the voltage selection control signal GPIO0.

The gate driving voltage GVDD may be applied to the reference voltage line RVL connected to the pixels P. Then, as described with reference to FIG. 3, the voltage in the reference voltage line RVL may be sensed through the sensing unit 310 of the SDIC, and the timing controller 140 may determine the voltage value of the gate driving voltage GVDD based on the sensing data Vsen received from the sensing unit 310.

In the gate sensing mode, the gate driving voltage GVDD may be generated to gradually increase from a baseline voltage or a predetermined or selected low-level voltage to a higher level voltage. When the gate driving voltage GVDD reaches a level that can turn on the circuit components constituting the gate driving circuit 130, the feedback current If output from the gate driving circuit 130 may be sensed through the sensing unit 310. For example, the sensing unit 310 may sense the feedback current If output from the dummy pull-down transistor Dd when the dummy pull-down transistor Dd is turned on. The sensing unit 310 may transmit the feedback current If to the timing controller 140. In some embodiments, the sensing unit 310 may sense the gate driving voltage GVDD via the reference voltage line RVL. For example, the sampling switch SAM may be turned on, such that the sensing unit 310 is connected to the reference voltage line RVL. Accordingly, the sensing unit senses the gate driving voltage GVDD. That is, the sensing unit 310 may directly sense the gate driving voltage GVDD supplied to the gate driving circuit 130.

Based on the sensed feedback current If, the timing controller 140 may determine that the gate driving circuit 130 has been enabled through the sensed gate driving voltage GVDD. That is, the timing controller 140 may determine the sensed gate driving voltage GVDD as the minimum or lowest voltage that can power on the gate driving circuit 130 and set it as the initial value of the gate driving voltage, GVDD. For example, the timing controller 140, in response to the feedback current If exceeding a threshold value, may control the sampling switch SAM to turn on so that the sensing unit 310 may sample the gate driving voltage GVDD via the reference voltage line RVL. The sampled gate driving voltage GVDD may be converted to sensing data Vsen by the sensing unit 310 as described with reference to FIG. 3, and the sensing data Vsen may be stored in the memory 320 as the initial value.

In this embodiment, the display device 100 may determine the initial value of the gate driving voltage GVDD by directly sensing the gate driving voltage GVDD through the SDIC in such a way as to control the switching circuit of the power control unit 150, eliminating the necessity of a separate external circuit to determine the initial value of the gate driving voltage GVDD. This embodiment simplifies the sensing circuit structure for sensing the gate driving voltage GVDD to reduce sensing defects caused by long transmission paths of electrical signals, leading to improvement of sensing accuracy.

The display device and driving method thereof according to the embodiments is capable of solving the issue of rapid lifespan reduction in the gate driving circuit by avoiding the continuous application of a high-level gate driving voltage in direct current.

The display device and driving method thereof according to the embodiments is capable of extending the lifespan of the gate driving circuit by gradually increasing the gate driving voltage from its initial value, which corresponds to the turn-on voltage of the transistor, based on the degree of degradation of the gate driving circuit.

Although embodiments of this disclosure have been described above with reference to the accompanying drawings, it will be understood that the technical configuration of the this disclosure described above can be implemented in other specific forms by those skilled in the art without changing the technical concept or features of the present disclosure. Therefore, it should be understood that the embodiments described above are example and not limited in all respects. In addition, it should be understood that all modifications or variations derived from the meaning and scope of the claims and their equivalent concept are included within the scope of the this disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A display device, comprising:
- a display panel including a pixel arranged thereon;
- a gate driving circuit that, in operation, supplies a scan signal to the pixel;
- a power control circuit that, in operation, outputs a gate driving voltage to the gate driving circuit;
- a sensing circuit that, in operation, senses an input electric signal and outputs sensing data; and
- a timing controller that, in operation, controls operations of the gate driving circuit, the power control circuit, and the sensing circuit,
- wherein the timing controller, in operation, further sets as an initial value of the gate driving voltage a voltage value of the gate driving voltage sensed by the sensing circuit upon the gate driving circuit being powered on by the gate driving voltage,
- wherein:
- the power control circuit, in operation, increases the gate driving voltage gradually from a baseline voltage;
- the gate driving circuit, in operation, powers on to output a feedback current upon the gate driving voltage reaching a lowest voltage that can drive the gate driving circuit; and
- the timing controller, in operation, sets the voltage value of the gate driving voltage sensed, upon the feedback current being output, by the sensing circuit as the initial value of the gate driving voltage.

2. The display device of claim 1, wherein the power control circuit comprises:
- a first switch connected between a reference voltage and a reference voltage line of the pixel; and
- a second switch connected between the gate driving voltage and the reference voltage line,
- wherein the timing controller, in operation, outputs a voltage selection control signal to control turning on of the first switch and the second switch.

3. The display device of claim 2, wherein the first switch is turned based on the voltage selection control signal being at a first level, and the second switch is turned on based on the voltage selection control signal being at a second level different from the first level.

4. The display device of claim 3, wherein the timing controller, in operation, outputs the voltage selection control signal at the second level and senses the voltage value of the gate driving voltage output to the reference voltage line via the sensing circuit.

5. The display device of claim 3, wherein the timing controller outputs the voltage selection control signal at the first level and senses an electrical signal outputted to the reference voltage line via the sensing circuit to determine a characteristic value of the pixel.

6. The display device of claim 1, wherein the gate driving circuit comprises:
- a gate output buffer circuit including:
  - a pull-up transistor that, in operation, controls a first connection between a clock input node and a gate output node; and
  - a pull-down transistor that, in operation, controls a second connection between a low level voltage node and the gate output node;
- a control circuit that, in operation, controls the gate output buffer circuit; and
- a dummy pull-down transistor sharing a gate node with the pull-down transistor.

7. The display device of claim 6, wherein the sensing circuit, in operation, senses an electrical signal outputted from the dummy pull-down transistor, and the timing controller, in operation, compensates the gate driving voltage in a stepwise manner from the initial value based on the sensed electrical signal.

8. The display device of claim 7, further comprising a data driving circuit that, in operation, provides a data voltage to the pixel, the data driving circuit including a plurality of source driver integrated circuits, wherein the sensing circuit is included within the plurality of source driver integrated circuits.

9. A driving method, comprising:
- providing a scan signal to a pixel by a gate driving circuit;
- applying a gate driving voltage to the gate driving circuit via the power control circuit;
- upon the gate driving circuit being powered on, sensing a voltage value of the gate driving voltage output from the power control circuit; and
- setting the sensed voltage value as an initial value of the gate driving voltage,
- where:
- the applying a gate driving voltage comprises increasing the gate driving voltage gradually from a baseline voltage; and
- the sensing a voltage value of the gate driving voltage comprises:
- outputting a feedback current by the gate driving circuit being powered on upon the gate driving voltage reaching a lowest voltage that can drive the gate driving circuit; and
- sensing the voltage value of the gate driving voltage output from the power control circuit upon the feedback current being output.

10. The method of claim 9, wherein:
- the power control circuit comprises:

a first switch connected between a reference voltage and a reference voltage line of the pixel; and a second switch connected between the gate driving voltage and the reference voltage line, and the method further comprises outputting to the power control circuit, before the applying of the gate driving voltage, a voltage selection control signal for controlling the first switch and the second switch to turn on.

11. The method of claim 10, wherein the sensing a voltage value of the gate driving voltage comprises:

turning on the second switch upon the voltage selection control signal being at a second level; and sensing the voltage value of the gate driving voltage outputted to the reference voltage line via the sensing circuit.

12. The method of claim 10, further comprises:

turning on the first switch upon the voltage selection control signal being at a first level; and determining a characteristic value of the pixel by sensing an electrical signal output to the reference voltage line via the sensing circuit.

13. The method of claim 9, wherein the gate driving circuit comprises:

a gate output buffer circuit including:

a pull-up transistor controlling the connection between a clock input node and a gate output node; and a pull-down transistor controlling the connection between a low level voltage node and the gate output node;

a control circuit controlling the gate output buffer circuit; and a dummy pull-down transistor sharing a gate node with the pull-down transistor.

14. The method of claim 13, further comprising:

sensing an electrical signal outputted from the dummy pull-down transistor; and compensating the gate driving voltage in a stepwise manner from the initial value based on the sensed electrical signal.

15. A display device, comprising:

a display panel including a pixel arranged thereon;

a gate driving circuit having a gate line coupled to the pixel;

a power control circuit coupled to the gate driving circuit;

a sensing circuit coupled to the gate driving circuit; and a timing controller coupled to the gate driving circuit, the power control circuit, and the sensing circuit, wherein the timing controller, in operation:

in a first operating mode:

controls the power control circuit to output a reference voltage to a reference voltage line; and determines a characteristic value of the pixel by controlling the sensing circuit to sense an electrical signal outputted to the reference voltage line in response to the reference voltage; and in a second operating mode:

controls the power control circuit to output a gate driving voltage to the gate driving circuit and the reference voltage line;

gradually increases the gate driving voltage from a baseline voltage to a voltage value, thereby generating a feedback current; and in response to the feedback current exceeding a threshold value, controlling the sensing circuit to sample the gate driving voltage on the reference voltage line, thereby generating a sensed value.

16. The display device of claim 15, wherein the timing controller, in operation:

controls the sensing circuit to generate sensing data based on the sensed value; and stores an initial value of the gate driving voltage in memory based on the sensing data.

17. The display device of claim 15, wherein the second operating mode takes place at each blank time between active times during image display by the display device.

18. The display device of claim 15, wherein the gate driving circuit comprises:

a gate output buffer circuit including:

a pull-up transistor that, in operation, controls a first connection between a clock input node and a gate output node; and a pull-down transistor that, in operation, controls a second connection between a low level voltage node and the gate output node;

a control circuit that, in operation, controls the gate output buffer circuit; and a dummy pull-up transistor sharing a gate node with the pull-up transistor, wherein the feedback current is generated by the dummy pull-up transistor.

* * * * *